Aug. 24, 1965   G. E. PHILLIPS, SR., ET AL   3,202,800
GLASS FIBER BUSHING TEMPERATURE CONTROLLER
Filed June 17, 1963   3 Sheets-Sheet 3

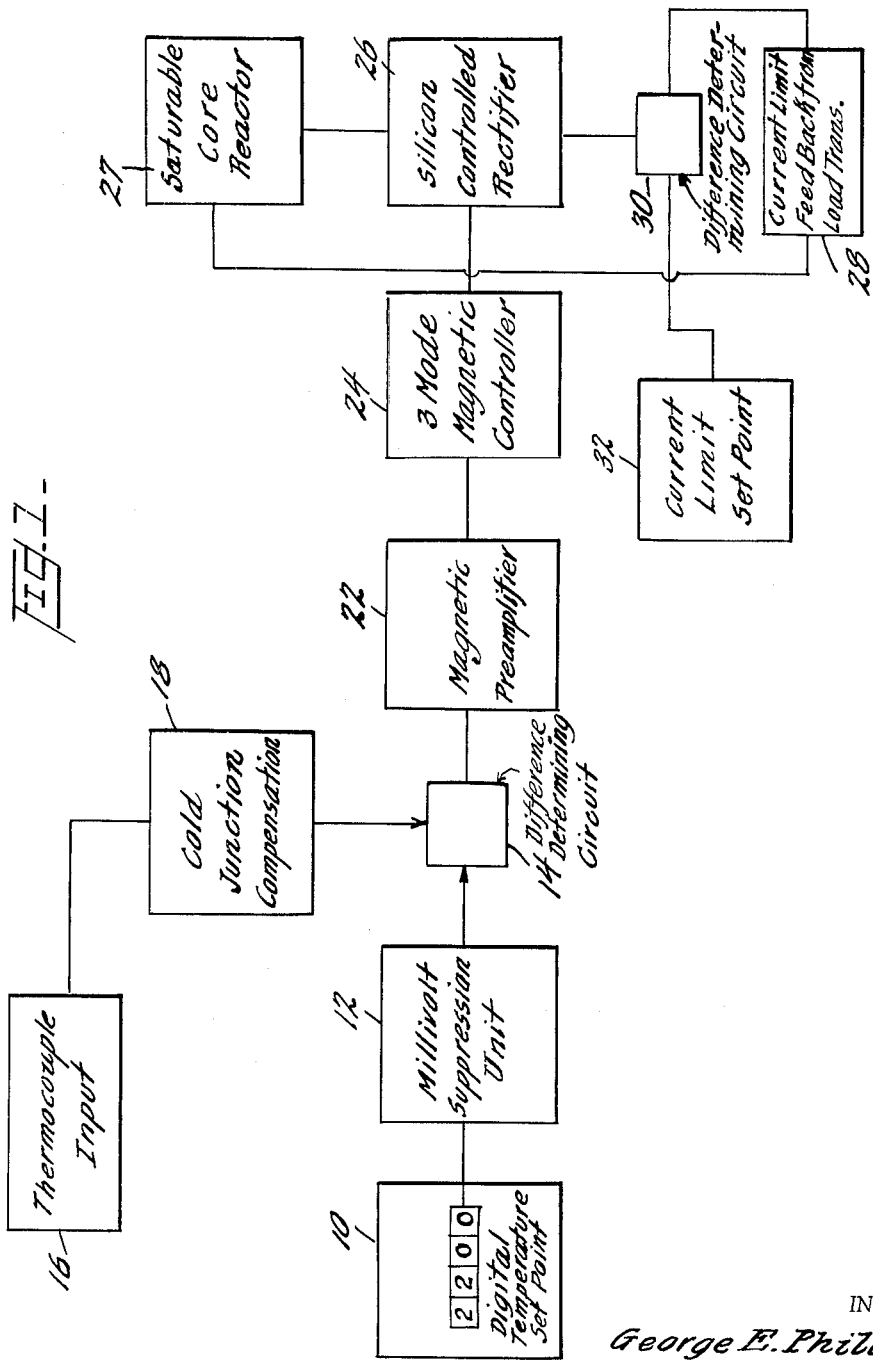

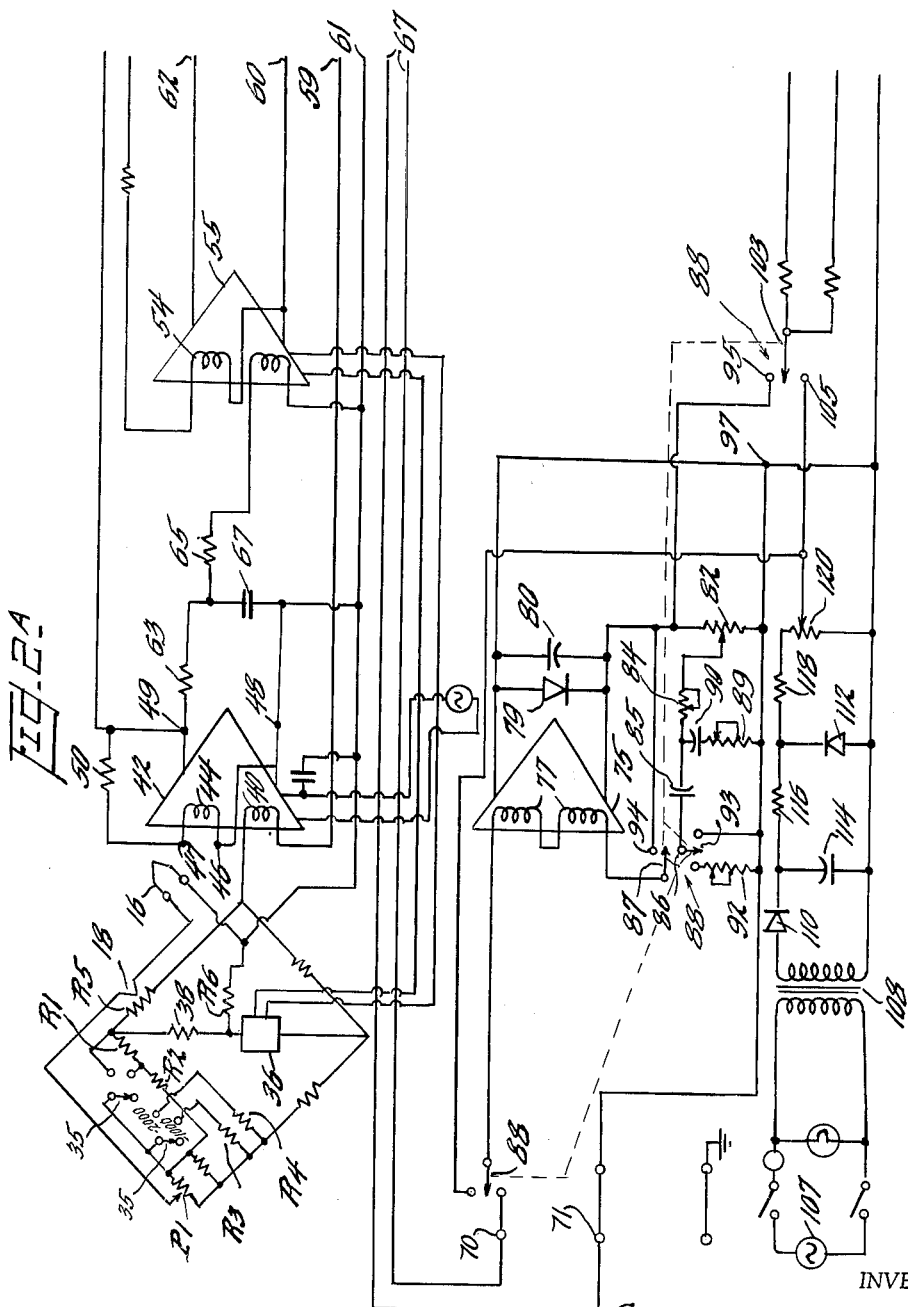

FIG. 2B

INVENTORS
George E. Phillips, Sr.
Paul E. Straight
BY Watson, Cole, Grindle & Watson
ATTORNEYS GLASS FIBER BUSHING TEMPERATURE
CONTROLLER
George E. Phillips, Sr., and Paul E. Straight, Fairmont,
W. Va., assignors to Electronic Control Systems, Inc.,
Fairmont, W. Va., a corporation of West Virginia
Filed June 17, 1963, Ser. No. 288,379
10 Claims. (Cl. 219—497)

This invention relates to electrical control systems for closely controlling the temperature of a die. More particularly, this invention relates to magnetic amplifier, silicon controlled rectifier devices and associated circuitry for the control of bushing or die temperature in the production of glass fiber.

Continuous fiber glass yarn is made by drawing multiple strands of glass from molten glass flowing through holes in an electrically heated platinum bushing. The fibers are pulled from the bushing at a high speed by a winder at over 3 miles per minute, the high speed drawing the molten glass down to a fine fiber. It would take over 1,700 miles of a single strand from a typical yarn to weigh a pound. The yarn drawn from a single bushing usually contains from 200 to 400 strands.

The viscosity of glass changes very rapidly with temperature and the change in viscosity causes the flow of glass, and hence the size of the yarn, to change. The number of yards per pound of yarn will change approximately 1% for each degree Fahrenheit temperature change. Premium yarns with a tolerance of ±2½% have been sold, and since conditions other than temperature can cause yardage variation, it is necessary to hold bushing temperature to extremely close tolerances.

The bushing is electrically heated and is built like a small platinum bath tub with holes in the bottom and lugs on the ends to conduct electric current to the tub. A high heating current at low voltage is passed through the tub. The current is supplied at a low voltage of the order of 3 volts by a stepdown transformer whose primary is fed from a high voltage source such as a 440 volt line through a saturable reactor which is used to control the current. The D.C. control winding of the reactor is fed from the temperature control equipment to hold the temperature to the desired point. A platinum thermocouple is welded directly to the tub or bushing to sense its temperature.

In accordance with one illustrative embodiment of this invention, a novel magnetic amplifier electrical control system is employed in temperature control of glass fiber production bushings. One known system is disclosed in Patent No. 3,047,647 Robert E. Harkins et al., May 15, 1962. This known system includes electronic means for amplifying the difference signal derived from the thermocouple and supression bridge by an A.-C. carrier type of electronic amplifier. This amplifier may include either vacuum tubes or transistors and employs a D.-C. to A.-C. modulator to convert this low level millivoltage difference signal to a modulated A.-C. signal for amplification purposes in order to achieve the necessary stability and sensitivity. The modulator may be either of the mechanical or semiconductor type or a high frequency magnetic type (400 to 3000 c.p.s.).

Accordingly, it is an object of this invention to provide an improved temperature control system.

It is another object of this invention to provide an improved temperature control system for glass fiber bushings having a magnetic amplifier type of difference (null) amplifier.

It is another object of this invention to employ in a temperature control system a magnetic amplifier with one control winding to obtain a combined signal composed of proportional, reset and rate signals.

It is still another object of this invention to employ a magnetic amplifier as a preamplifier to receive the signal from a thermocouple to provide high normal mode rejection as well as extreme reliability in a temperature control system.

It is a still further object of this invention to employ in a temperature control system passive R-C feedback networks to obtain the long integration time constants to provide combined signals to a single winding of a magnetic controller, the signals corresponding to proportional, reset and rate signals with respect to the die.

In this illustrative embodiment, the magnetic amplifier used to amplify this millivoltage difference signal is a two-stage magnetic amplifier employing stabilizing and feedback networks to insure the required performance from a magnetic amplifier operating from a 50 or 60 c.p.s. alternating current source and requiring no stabilized D.C. power supplies or input modulators. The difference signal is fed directly into a magnetic control winding which winding also supplies the high degree of common and normal mode rejection essential to the operation of this control apparatus.

The previously mentioned known system employs a magnetic 3 mode controller which utilizes separate windings for each control mode, i.e., one winding is used exclusively for reset (integral), another for rate (derivative) and yet another for proportional action, and a separate magnetic amplifier is used to generate signals controlling the integral (reset) action. In this illustrative embodiment, the magnetic controller utilizes a single magnetic amplifier with one control winding and R-C feedback networks to generate a single control action signal composed of the sum of proportional, reset and rate signals.

The combined signal controls a magnetic pulse amplifier which will fire silicon controlled rectifiers to produce a high power output. This magnetic firing circuit employs special isolated control windings to eliminate any feedback from the high speed switching silicon controlled rectifiers which would be detrimental to the control performance by impairing stability and sensitivity. Also, the circuit of this magnetic pulse amplifier includes a current limiting circuit which delivers negative feedback from the load current transformer to limit the output current to some preset value.

The basic operation of this embodiment of applicants' temperature controller is as follows: The thermocouple E.M.F. is compared against a precision millivolt reference referred to as the "temperature set point." Any difference between the actual temperature (T.C.) and the desired temperature (set point) is amplified by a D.C. magnetic amplifier which in turn operates a 3 mode magnetic amplifier control unit or controller. The output of this controller feeds the saturable core reactor (approximately 20 kw.) previously mentioned. The resultant electrical heating changes the fiber glass temperature until the error signal is reduced to zero. The controller is sufficiently accurate to maintain the temperature at the set point without permitting it to deviate by more than ¼° F.

The output of the 3 mode magnetic control unit (automatic signal) can be switched out of the power output stage and replaced by a manually operated signal from a potentiometer by means of the automatic-manual transfer switch. This permits manual control of the bushing temperature when necessary.

Because these production bushings are used on a 24-hour basis, reliability is quite an important requirement of the temperature control units. The use of magnetic amplifiers in this invention is one of its important features. Not only is the magnetic amplifier the most reliable of amplifying devices, but it is also ideally suited as the preamplifier due to its inherent high rejection to normal mode electrical noise. This is an important characteristic since the thermocouple sensing device is welded directly to the bushing and, therefore, has an A.C. voltage of 60 c.p.s. or some multiple generated in effective series connection with the thermocouple. This signal can be many times larger than the actual control signal E.M.F. generated by the thermocouple. Because the magnetic preamplifier operates from a 50/60 c.p.s. source, the amplifier has a very high inherent rejection to these signals without the use of R-C rejection filters or other such passive rejection networks. The use of a 50/60 c.p.s. magnetic amplifier as a preamplifier to receive the signal from the thermocouple and to provide high normal mode rejection as well as extreme reliability is therefore an important feature of this invention.

Another important feature of this invention is to employ a 3 mode magnetic controller utilizing passive R-C lead-lag feedback networks to obtain the long integration time constants necessary without the necessity of using extremely large values of capacitor and associated capacitor switching, but providing the integration adjustment with an adjustable potentiometer. The very low input current (approximately 0.1 microampere) required by the operational magnetic amplifier permits the use of resistance values in the low megohm range.

Other objects and features of this invention will be more clearly understood from a reading of the detailed description when considered in connection with the accompanying drawing in which:

FIGURE 1 is a block diagram of one illustrative embodiment of this invention; and FIGURES 2a and 2b are a combined block and schematic diagram of the embodiment of FIGURE 1.

Referring now to FIGURE 1, there is depicted a block diagram of one illustrative embodiment of this invention. As therein depicted, block 10 represents a digital temperature setpoint device, the output of which is connected to a suppression circuit 12. The output of the suppression circuit 12 is connected to a difference determining circuit 14. The system also includes a thermocouple unit 16 having its output connected to a cold junction compensating circuit 18. The output of compensating circuit 18 is also applied to the difference determining circuit 14. The output of the difference determining circuit 14, which is a signal indicative of the difference of its input signals, is fed to a two-stage D.C. magnetic preamplifier 22. The output of the preamplifier 22 is applied to a 3 mode magnetic controller 24. The output of the 3 mode magnetic controller is applied to a magnetic silicon controlled rectifier 26. The output portion of the output stage includes silicon controlled rectifiers connected in the form of a bridge with the output of the bridge connected to the control winding of firing reactor 27. The system includes a current limit feedback circuit 28 which is connected to the load transformer, not shown, and delivers an output signal to a difference determining circuit 30. The difference determining circuit 30 also receives an input signal from the current limit setpoint circuit 32. The difference determining circuit provides an output which is the difference of the signals received from circuits 28 and 32 and delivers this difference signal to the silicon controlled rectifier stage 26 in a manner which will be subsequently described.

Referring now to FIGURES 2a and 2b, there is depicted in schematic and block form one illustrative embodiment of the invention depicted in FIGURE 1. In FIGURE 2a, the thermocouple 16 is the actual temperature sensing device which is attached to the glass fiber die, not shown, and this thermocouple is connected to a bridge circuit through a resistor network including resistors $R_1$, $R_2$, $R_3$, $R_4$ and $P_1$ for setting the control system to a value indicative of the desired temperature. A Zener diode reference voltage circuit 36 is connected across diagonals of this bridge by means of a resistor 38. The other side of the thermocouple 16 is connected to the bridge through resistor $R_6$ and cold junction compensation thermocouple 18. The output of this bridge is delivered to a winding 40 of the first stage 42 of a two-stage magnetic preamplifier which was designated by the reference 22 in FIGURE 1. Inductively coupled to winding 40 is a second winding 44 which has input terminals 46 and 47. The input terminals 46 and 47 are connected to the output terminals 48 and 49 of the amplifier 42 to derive a feedback to the amplifier, one of the feedback paths being through resistor 50. In order to obtain the required accurate control of the die, the E.M.F. generated by thermocouple 16 must be cancelled or suppressed by an E.M.F. equal and opposite to the thermocouple signal at the desired control temperature. The desired operating range of the control system is preferably in the order of 1800° F. to 2800° F. and will hereafter be referred to as the direct range. When the suppression circuit switch 35 is placed in the direct range position as indicated on the drawing, resistors $R_1$ and $R_2$ are inserted in the upper left leg of the bridge circuit. The Zener diode voltage reference circuit 36 provides a fixed current through these resistors resulting in a millivolt E.M.F. which, when added to the millivolt E.M.F. of the adjustable temperature setpoint potentiometer $P_1$, results in a millivolt E.M.F. variable from 1800 to 2800° F. per thermocouple standard curves. This suppression millivoltage is in a direction to subtract from the thermocouple signal from thermocouple 16 thereby producing a zero E.M.F. between the output terminals of the bridge circuit.

Resistor $R_5$ is a resistor wound with temperature sensitive wire in such a manner that, as the ambient temperature surrounding the instrument changes resulting in a change of the thermocouple cold junction 18, the resistor $R_5$ will generate an equal and opposite E.M.F. to cancel out there effects, i.e., it is the cold junction compensation device indicated as block 18 in FIGURE 1. All other resistors used in the suppression bridge are manufactured with low temperature coefficient wire which presents a low E.M.F. against the other interconnecting wire so as to provide a very stable reference millivoltage for the control system. When the suppression switch 35 is connected to its −1000 position, the setpoint range previously indicated as 1800 to 2800° F. is now changed to 800 to 1800° F. because resistor $R_2$ and its resultant E.M.F. has been switched out or disconnected from the suppression circuit. Similarly, when suppression switch 35 is switched to its −2000 range, the suppression is changed to −200 to 800° F. These suppression values below the normal operating range of 1800 to 2800° F. are employed when heating the glass fiber die or bushing to an operating range from a cold condition. The temperature is slowly increased by means of the suppression setpoint resistor $P_1$ until the operating range of 1800 to 2800° F. is reached at which time the temperature is set at exactly the desired value by means of resistor $P_1$.

As previously mentioned, the output of the suppression bridge circuit is connected to the input winding 40 of the two-stage magnetic preamplifier 22. This preamplifier is a null type amplifier which detects and amplifies any deviation of the thermocouple signal from the suppression setpoint (error signal). Each of these two stages of magnetic amplification are of the second harmonic type with a very high open loop gain. Feedback is employed around each individual amplifier through windings 44 and 54. Overall negative feedback is employed by sensing the voltage across resistor 58 (FIGURE 2b) connected across the output terminals 60 and 62 of amplifier 55 and this feedback is applied through leads 59 and 61 to winding 40 of amplifier 42. This type of resistive feedback results in a very high amplifier input impedance at null, i.e. when the setpoint and thermocouple signal are equal as in normal automatic operation. Resistors 63 and 65 and capacitor 67 provide filtering for the input of amplifier 55 to increase overall stability. The output of the second stage 55 provides the amplified input error signal to the 3 mode magnetic amplifier controller indicated by triangle 75. The output of the two-stage preamplifier 20 also operates a null type microammeter 66 which is calibrated plus and minus 10° F. This meter thus indicates the amount that the controlled temperature deviates from the temperature setpoint.

The output of amplifier 55 is connected through terminals 70 and 71 to the input of a 3 mode magnetic controller 24. This controller includes a magnetic amplifier 75 having a single input winding 77. The output of amplifier 75 is bridged or connected in parallel with a Zener diode 79 and a capacitor 80, which capacitor filters the output of the amplifier 75. The diode characteristic of the Zener diode prevents reverse voltages on the capacitors of the 3 mode feedback network, which will be subsequently described, and the Zener breakdown characteristic protects the forward voltage characteristic of the capacitors of the feedback network. The feedback network includes a series parallel arrangment of resistors and capacitors. Variable resistor 82 is connected in parallel with the Zener diode 79 and the sliding contact of this variable resistor is connected through a second variable resistor 84 and a capacitor 85 to a switch contact 86 of switch 88. The feedback network also includes a variable resistor 89 and a capacitor 90 which are connected in series midway between capacitor 85 and variable resistor 84 and one side of the output from amplifier 75. The feedback network also includes a variable resistor 92 which is connected in the circuit by means of switch 88. When the armature or moving contact 87 of switch 88 is moved to engage terminal 86 and the moving contact 93 is moved to connect the variable resistor 92 in the circuit, the feedback network is connected to control the proportional, reset and rate action of the controlled system. The proportional gain of the controller is controlled by adjusting the feedback potentiometer 82 which adjusts the amount of negative feedback from the output of amplifier 75 to its input winding 77. The lead-lag network defined by potentiometers 84, 92 and 89 and capacitors 85 and 90 provides for controlling reset and rate action of the controller. The reset (integrate) time constant is obtained from variable resistor 92 and capacitor 85 and can be adjusted by varying variable resistor 92. The rate action not only has an adjustment on the rate time constant, but the rate gain can also be adjusted by potentiometer 89. It is to be noted that switch 88 includes a contact 94 positioned to be engaged by contact 87 to thereby define a direct feedback path from the output to the input of amplifier 75 thereby providing for unit gain of the amplifier under conditions which will be subsequently described.

The output of amplifier 75 is connected to terminals 95 and 97 and terminal 97 is connected to one of the windings 99 of a self-saturating magnetic amplifier 100 (see FIG. 2b). The other side of winding 99 is connected to contact 103 of switch 88 which contact is positioned to engage either contact 95 or contact 105 which is the output terminal of a manual control signal source which will be subsequently described. If the system is to be operated automatically, the contact 103 is moved into engagement with contact 95, thus the output of amplifier 75 is fed to the input winding 99 of the self-saturating magnetic amplifier 100. If, however, it is decoded to manually control the temperature, the contact 103 is moved into engagement with contact 105 and thereby connects the winding 99 to a closely regulated source of alternating current signals defined by generator 107, transformer 108 and a filter network including rectifiers 110 and 112, capacitor 114 and a pair of serially connected resistors 116 and 118. The manual control is achieved through parallel connected variable resistor 120 so that the alternating current input signal to winding 99 may be accurately controlled by adjusting variable resistor 120.

The self-saturating magnetic amplifier includes a second input winding 122 connected in parallel with winding 99 which windings control the saturation of a pair of toroidal cores 124 and 126.

The self-saturating magnetic amplifier 100 includes windings 130 and 132 which are connected through rectifiers 134 and 136 respectively, to control the silicon controlled rectifiers 138 and 140 in a manner which will be subsequently described. A source of alternating current 107′ is connected to terminals 142 and 144 which terminals are connected to power winding 146 of the self-saturating magnetic amplifier 100. The circuit of the self-saturating magnetic amplifier 100 includes further windings 148 and 150 which are connected through rectifiers 152 and 154 respectively to the gates of silicon controlled rectifiers 138 and 140 respectively. Because rectifiers 138 and 140 are also connected to terminals 142 and 144 respectively, these rectifiers can be controlled by suitable signals fed through rectifiers 134 and 136. Rectifiers 138 and 140 define two legs of the output bridge circuit which includes rectifiers 160 and 162 in the other legs and a rectifier 164 across output leads 166 and 170. A saturable core reactor 172 has its control winding connected to terminals 166 and 170. In the operation of the self-saturating magnetic amplifier, the silicon controlled rectifiers and the saturable core reactor, the toroidal cores 124 and 126 and the associated gate windings defined by windings 130, 132, 148 and 150 present a very high impedance to the supply generator 107′ in the unsaturated state of the toroids. For this condition the silicon controlled rectifiers gate signal is blocked and no line current or current from generator 107 passes through rectifiers 138 and 140. The D.C. controlled windings 99 and 122 are wound in such a manner as to create a magnetic flux in the toroidal cores 124 and 126 which is additive to the flux produced in the gate winding 129. As the D.C. control signal increases, the cores will become saturated at some point in the advancing wave front of the gate signal. When the cores go into saturation, the impedance of the gate winding 129 diminishes to near zero, thus permitting a voltage to be impressed between the silicon controlled rectifier gates and cathodes and the silicon controlled rectifiers will fire. Thus, with a given phase relationship between the anode and gate voltages, the point at which firing of the rectifiers occurs in any half cycle is advanced proportionally as the control current increases.

The resulting control signal from the silicon controlled rectifier is fed through terminals 166 and 170 to control the control winding of the saturable core reactor 172 in a manner well known in the art. The output winding of the saturable core reactor 172 is connected to control the power fed through a stepdown transformer 175 which is employed to feed the low voltage heating current to the glass die 177. Advantageously, the saturable reactor may include a bias winding 178 and a source of biasing potential 178 connected to the bias winding. The input to the load winding of the saturable core reactor 172 is obtained from a generator 107′ which generator supplies the stepdown transformer 175 through the load winding of the reactor. The stepdown transformer feeds a signal to current limiting feedback network 180 and windings 182 and 184 of the self-saturating magnetic amplifier. The current limiting feedback network includes Zener diode 186 which is connected to a variable resistor 188 of the feedback network. Zener diode 186 permits passage of current to control windings 182 and 184 only when the feedback is above the current limit setpoint as set by potentiometer 188. Meter 190 is included in the feedback network 180 to give a direct reading of load current as limited by the turns ratio of the load current transformer 175. The feedback network includes rectifiers 192 and 194, which rectify the signal fed from the transformer 175 and capacitor 195 filters the ripple from the resultant rectified signal. Rectifiers 196 and 198 are included in the feedback network 180 to insure the transmission of only a direct current signal to control windings 182 and 184. Resistors 199 and 200 are included in the meter circuit of meter 190. Resistor 199 is a shunt which bypasses the major portion of the feedback current, while resistor 200 further limits the current through the meter 190.

While we have shown and described one illustrative embodiment of this invention, it is understood that the concept thereof may be applied to other embodiments without departing from the spirit and scope of this invention.

What is claimed is:

1. A control system for closely controlling the temperature of a glass fiber bushing comprising a Wheatstone bridge, a thermocouple connected to said bridge and positioned to sense the temperature of said bushing, said bridge including means for setting the desired temperature of said bushing, a two-stage magnetic amplifier having its input connected to said bridge, each stage of said amplifier including means for producing positive feedback from the output to the input of said stage, means for producing negative feedback from the output of the second stage to the input of the first stage of said amplifier, an R-C network coupled between said stages to provide increased overall stability, a magnetic amplifier controller having its input connected to the output of said second stage magnetic amplifier, said magnetic controller including a single magnetic amplifier with one input winding, means for producing a feedback from the output of said single amplifier to the input winding of said single amplifier, said feedback means including means for producing proportional rate and reset indicating feedback signals, a self-saturating magnetic amplifier having its input connected to the output of said single magnetic amplifier, a silicon controlled rectifier bridge having its input connected to said self-saturated magnetic amplifier, a saturable core reactor having its control winding connected to the output of said silicon controlled rectifier bridge, a transformer connected to said reactor to be controlled thereby a current-limiting feedback network connecting said transformer to said self-saturating magnetic amplifier.

2. The combination according to claim 1, wherein said means for producing a feedback signal indicative of proportional, rate and reset signals comprise an R-C network connected in series parallel relationship between the output of said single magnetic amplifier and the input winding of said single magnetic amplifier.

3. The combination according to claim 2, wherein said R-C network for controlling the feedback comprises a serially connected capacitor and a parallel connected variable resistor for controlling the reset time constant by varying the setting of said variable resistor.

4. A control system according to claim 3, wherein said feedback means comprise a serially connected variable resistor and a parallel connected capacitor for adjusting the rate signal by varying said last mentioned resistor.

5. The control system according to claim 4 further comprising a Zener diode connected in parallel with the output of said magnetic controller to limit the output potential of said magnetic controller.

6. The combination according to claim 5 further comprising manual control means and means for switching the input of said self-saturating magnetic amplifier from said magnetic controller to said manual control means, said switching means also including means for switching said magnetic controller to provide unit gain while said manual control means is connected to said self-saturating magnetic amplifier.

7. In a control system for accurately controlling the temperature of a bushing, the combination comprising a magnetic controller consisting of a single magnetic amplifier having a single input control winding and connected to control the current to said bushing, feedback means consisting of R-C feedback networks connecting the output of said amplifier to the single input winding, said feedback means including means for generating feedback temperature controlling signals composed of the sum of proportional, reset and rate signals with respect to said bushing, silicon control rectifiers connected in a load circuit controllable by said magnetic controller, and a circuit firing said rectifiers from said controller through isolated control windings to eliminate feedback from the load circuit to the controller.

8. The combination according to claim 7, wherein said feedback means comprises a serially connected capacitor and variable resistor, as said variable resistor providing means for controlling the reset time constant.

9. The combination according to claim 8, wherein said feedback network comprises a serially connected variable resistor and a parallel connected capacitor wherein said last mentioned variable resistor defines means for controlling the rate action of said control system.

10. The combination according to claim 9, wherein said feedback network includes a variable resistor connected between the output of said amplifier and a portion of said feedback network for adjusting the time constant of said system.

References Cited by the Examiner

UNITED STATES PATENTS

| | | | |
|---|---|---|---|
| 2,931,577 | 4/60 | Bullen | 236—78 |
| 3,047,647 | 7/62 | Harkins et al. | 13—6 |
| 3,109,910 | 11/63 | Fogleman | 219—20.9 |

RICHARD M. WOOD, *Primary Examiner.*